United States Patent
Jeong et al.

(10) Patent No.: US 7,221,671 B2
(45) Date of Patent: May 22, 2007

(54) SYSTEM AND METHOD FOR ACCESSING NODE OF PRIVATE NETWORK

(75) Inventors: Min-Seop Jeong, Seoul (KR); Jung-Ho Song, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 956 days.

(21) Appl. No.: 09/901,486

(22) Filed: Jul. 10, 2001

(65) Prior Publication Data

US 2002/0024946 A1 Feb. 28, 2002

(30) Foreign Application Priority Data

Aug. 29, 2000 (KR) ................ 2000-50259

(51) Int. Cl.
*H04L 12/66* (2006.01)

(52) U.S. Cl. ................. 370/352; 370/392; 370/395.52; 370/395.54; 709/227; 709/245

(58) Field of Classification Search ................ 370/352, 370/401, 402, 392, 395.52, 395.54; 709/227, 709/245

See application file for complete search history.

(56) References Cited

U.S. PATENT DOCUMENTS

| | | | | |
|---|---|---|---|---|
| 5,878,218 A | * | 3/1999 | Maddalozzo et al. | 709/213 |
| 6,128,298 A | * | 10/2000 | Wootton et al. | 370/392 |
| 6,430,623 B1 | * | 8/2002 | Alkhatib | 709/245 |
| 6,795,917 B1 | * | 9/2004 | Ylonen | 713/160 |

* cited by examiner

*Primary Examiner*—Seema S. Rao
*Assistant Examiner*—Shick Hom
(74) *Attorney, Agent, or Firm*—Sughrue Mion, PLLC

(57) ABSTRACT

A system for accessing a node of a private network includes an assigning portion for assigning external port values to respective network nodes based on information collected from the network nodes of the private network, and storing the assigned external port values; an exchanging portion for exchanging the external port values of the respective network nodes of private networks; and an address converting portion for converting the external port values into corresponding private IP addresses and internal port values when a network node of one private network accesses another network node of another private network by using the external port values of another network node of another private network. Accordingly, a network node of a private network without a global IP address becomes accessible.

19 Claims, 9 Drawing Sheets

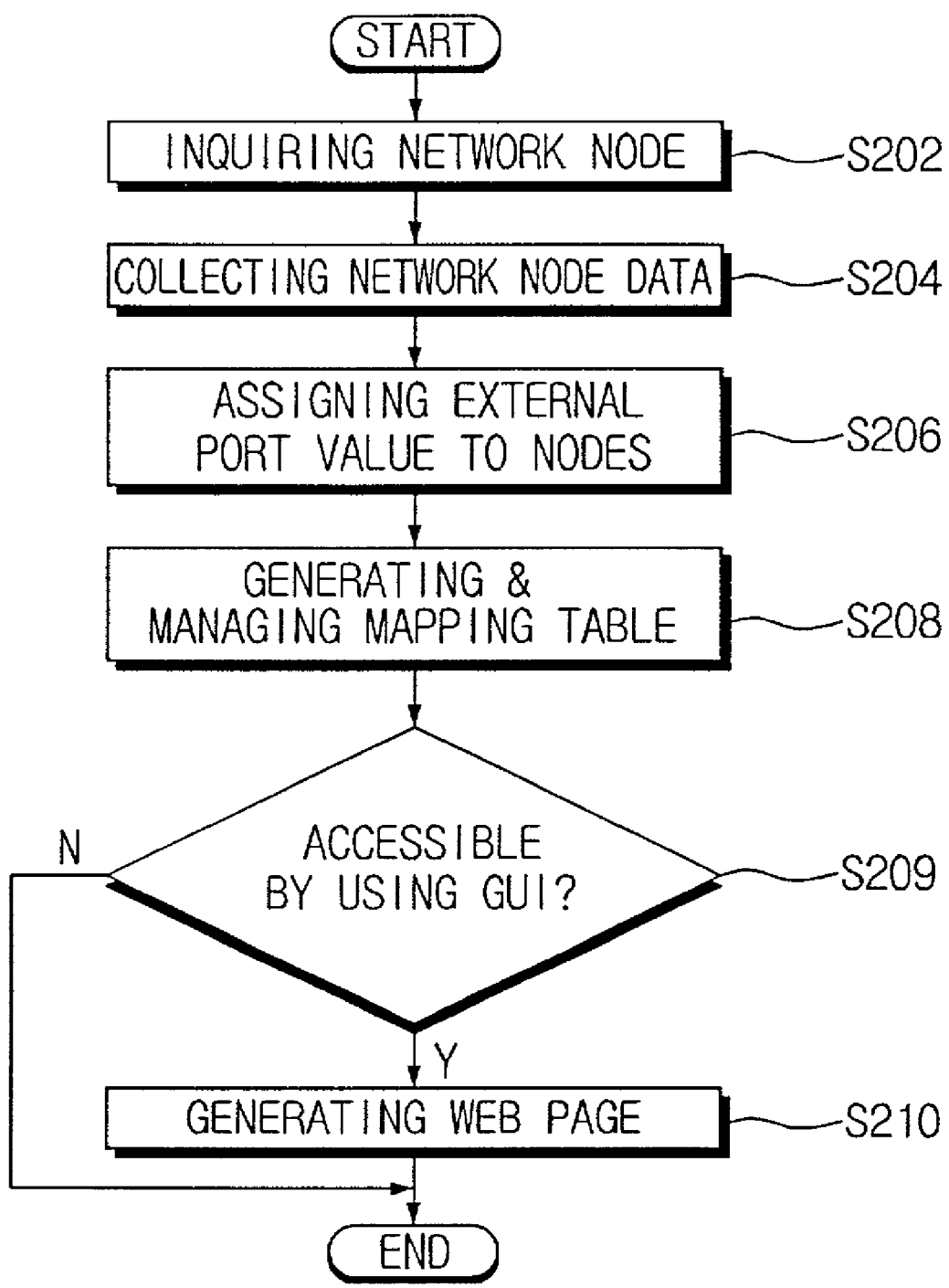

| HARDWARE ADDRESS | PRIVATE IP ADDRESS | INTERNAL PORT VALUE | GLOBAL IP ADDRESS | EXTERNAL PORT VALUE |
|---|---|---|---|---|
| $HA_1$ | $LIP_1$ | $LPN_1$ | SIP | $GPN_1$ |
| $HA_2$ | $LIP_2$ | $LPN_2$ | SIP | $GPN_2$ |
| ⋮ | ⋮ | ⋮ | ⋮ | ⋮ |
| $HA_n$ | $LIP_n$ | $LPN_n$ | SIP | $GPN_n$ |

(b)

| HARDWARE ADDRESS | PRIVATE IP ADDRESS | INTERNAL PORT VALUE | GLOBAL IP ADDRESS | EXTERNAL PORT VALUE |
|---|---|---|---|---|
| $HA_1'$ | $LIP_1'$ | $LPN_1'$ | DIP | $GPN_1'$ |
| $HA_2'$ | $LIP_2'$ | $LPN_2'$ | DIP | $GPN_2'$ |
| ⋮ | ⋮ | ⋮ | DIP | ⋮ |
| $HA_n'$ | $LIP_n'$ | $LPN_n'$ | DIP | $GPN_n'$ |

SYSTEM AND METHOD FOR ACCESSING NODE OF PRIVATE NETWORK

BACKGROUND OF THE INVENTION

1. Field of the Invention

The present invention relates to a system and method for accessing a node of a network, and more particularly to a system and method for accessing a node of a private network via the Internet. The present application is based on Korean Patent Application No. 2000-50259, which is incorporated herein by reference.

2. Description of the Background Art

Thanks to a technology advancement, information and communication devices such as computers, faxes, modems and telephones of an office can now be efficiently used in connection with each other within one network.

Most of the Small Office Home Office (SOHO) or home networks are private networks which are not assigned with global IP addresses.

A network without the global IP address should be connected to an Internet Service Provider (ISP) and assigned with a temporary global IP address, to access an external network.

Meanwhile, even if the SOHO or home network has the global IP address, only an access node of the office has the global IP address. Accordingly, other information and communication devices in the SOHO or home network are assigned with private IP addresses for use therewithin.

The private IP address is either assigned by a network administrator, or dynamically assigned by a Dynamic Host Configuration Protocol (DHCP).

In order to access a node of an external network, value of the nodes has to be converted from the private IP address into a global IP address.

When an internal node having a private IP address uses an external server via the Internet, a gateway in the access node of the private network assigns external port value to the internal node and sends out a packet by using a Network Address Port Translation (NAPT).

When receiving a response packet from the external network, the gateway restores the original private IP address and port value based on a port value included in the packet.

Here, the port value may be varied according to a type of communication protocols being used such as http, FTP and TELNET.

In the private network having the private IP address and constructed based on the NAPT, however, it is impossible for the other networks to obtain the port values of the nodes and send a packet to the nodes of the private network.

SUMMARY OF THE INVENTION

The present invention has been made to overcome the abovementioned problems of the related art, and accordingly, it is an object of the present invention to provide a system and method enabling an access among private networks which are not assigned with global IP addresses, by assigning external port values to internal nodes of the private networks and exchanging the assigned port values with each other.

The above object will be accomplished by a system for accessing a node of a private network according to the present invention, including an assigning portion for assigning external port values to respective network nodes based on information collected from the network nodes of the private network, and storing the assigned external port values; an exchanging portion for exchanging the external port values of the respective network nodes of private networks; and an address converting portion for converting the external port values into corresponding private IP addresses and internal port values when a network node of one private network accesses another network node of another private network by using the external port values of another network node of another private network.

The above object is also accomplished by a method for accessing a node of a private network according to the present invention, including the steps of a) assigning separate external port values to a plurality of network nodes of the private networks based on information collected from the network nodes, and storing the assigned external port values; b) exchanging the assigned external port value of a certain network node of a certain private external port values to network nodes based on information collected from the network nodes; a first exchanging portion for exchanging external port value of a certain node of the first network with external port value of one of the nodes of the second network, and storing the exchanged external port value; and a first address converting portion for converting the external port value of the certain node of the first network into a corresponding external port value, enabling the certain node of the first network to access the one of network nodes of the second network, while the second network includes a second external port value assigning portion for assigning external port values to network nodes based on information collected from the network nodes; a second exchanging portion for exchanging external port value of a certain node of the second network with external port value of one of the nodes of the first network, and storing the exchanged external port value; and a second address converting portion for converting the external port of the certain node of the second network into a corresponding private IP address, enabling the one of the nodes of the first network to access the certain node of the second network by using the external port value of the one of the nodes of the second network.

BRIEF DESCRIPTION OF THE DRAWINGS

The present invention will become better understood with reference to the accompanying drawings which are given only by way of illustration and thus do not limit the present invention, wherein:

FIG. 3 is a flowchart for explaining the process of assigning an external port value to the node of the network and building a database according to the present invention;

FIG. 4a is a view for showing a mapping table of a first network;

FIG. 4b is a view for showing a mapping table of a second network;

DETAILED DESCRIPTION OF THE PREFERRED EMBODIMENTS

A system and method for access among nodes of private networks according to the present invention will now be described in greater detail with reference to the accompanying drawings.

Figure 1:
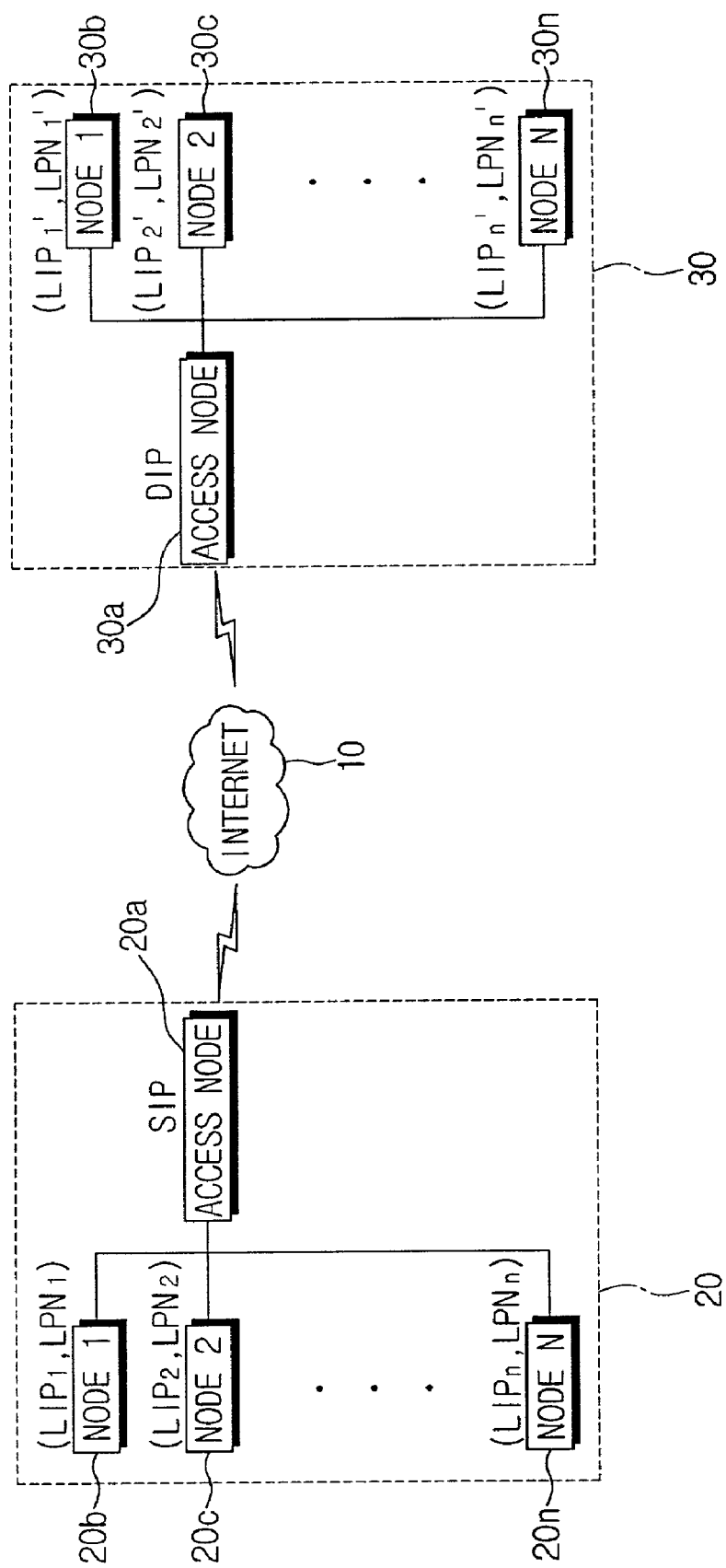
FIG. 1 is a view for showing the structure of a network according to the present invention.

FIG. 1 is a view for showing the structure of a network according to the present invention. As shown in FIG. 1, first and second networks 20 and 30 are separate networks which are spaced from each other and usually used in the networks of SOHO or home networks where a plurality of information and communication devices are connected in a network.

The first network 20 includes one access node 20a and a plurality of network nodes 20b, 20c, . . . , 20n. Here, the access node 20a is a router, gateway, switch, etc., for connecting the first network 20 to the Internet.

The network nodes 20b, 20c, . . . , 20n are information and communication devices such as computers, printers, facsimiles, etc., which are used in connection with each other within one network.

The access node 20a of the first network 20 is assigned with a global IP address, while the other network nodes 20b, 20c, . . . , 20n are assigned with private IP addresses which are used only in their network.

The private IP addresses may be provided by a network administrator, or automatically given through communication protocols such as DHCP.

Since the port number is a communication protocol of the network node, one node may have several port numbers.

Accordingly, in order to support several applications, the node is assigned with several external port values.

Described below is the case when one node is assigned with one port number.

Here, the global IP address assigned to the access node 20a of the first network 20 is SIP, while the private IP addresses and port numbers assigned to the other nodes 20b, 20c, . . . , 20n are $LIP_1$ and $LPN_1$, $LIP_2$ and $LPN_2$, . . . , and $LIP_n$ and $LPN_n$, respectively.

The second network 30 includes one access node 30a and a plurality of network nodes 30b, 30c, . . . , 30n.

The structure of the second network 30 is almost identical to that of the first network 20 except that the second network 30 has DIP as a global IP address, while the network nodes 30a, 30b, . . . , 30n thereof are assigned with private IP addresses and port numbers $LIP_1'$ and $LPN_1'$, $LIP_2'$ and $LPN_2'$, . . . , $LIN_n'$ and $LPN_n'$, respectively.

The access system according to the present invention enables an access of the node of the first network 20 to the node of the second network 30, i.e., from the access node 20a of the first network 20 to the access node 30a of the second network 30.

Figure 2:
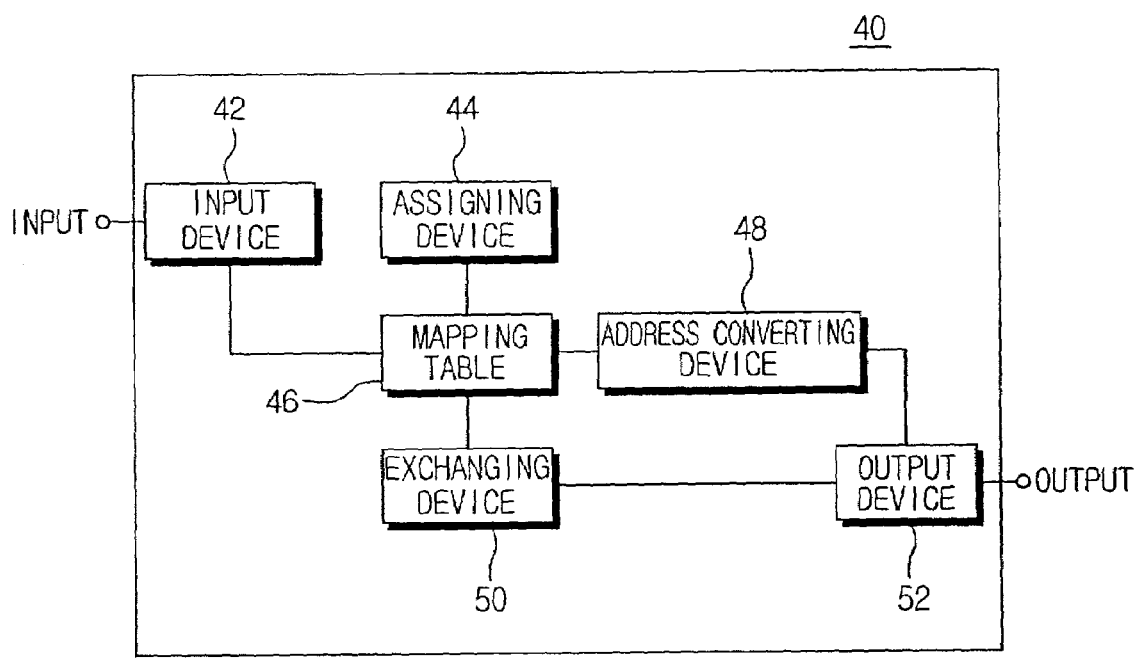
FIG. 2 is a block diagram for showing a system for accessing a node of the private network according to the present invention.

FIG. 2 is a block diagram for showing a private network access system according to the present invention.

As shown in FIG. 2, in order to gain access to a private network, the access system 40 includes an input device 42, external port value assigning device 44, mapping table 46, address converting device 48, exchanging device 50, and outputting device 52.

The external port value assigning device 44 collects information about respective internal nodes of the private networks and assigns separate external port values to the respective nodes.

The external port values, which are assigned to the network nodes of the private networks as above, are exchanged by the exchanging device 50 and stored in the mapping table 46.

When a certain node of one private network accesses another node of another private network by using the external port value of another node of another private network, the address converting device 48 converts the external port value into a corresponding private IP address and internal port value of another node of another private network.

The method for accessing nodes of another private network will be described below.

The method for accessing nodes of another private network includes the steps of assigning external port values to the network nodes of the private networks, exchanging the external port values with each other, and converting the external port values and forwarding packets.

FIG. 3 is a flowchart for explaining the step of assigning the external port values to the network nodes of the private networks.

According to the protocol of the present invention, the network nodes of the private network have to be assigned with external port values which can be used externally.

First, an access node of the one private network checks the type of network nodes (step S202).

Next, the access node collects response signals transmitted from the network nodes (step S204), and assigns external port values to the respective network nodes (step S206).

When the external port values are assigned to the network nodes, the external port values are stored in a mapping table (step S208).

FIG. 4 shows the mapping table, in which FIG. 4a shows the mapping table of the first private network 20 while FIG. 4b shows the mapping table of the second network 30.

As shown in FIGS. 4a and 4b, each of the first and second private networks 20 and 30 has a mapping table storing a hardware address, private IP address, internal port value, global IP address, and external port value.

The private networks that do not use the IP store hardware addresses in the mapping tables to gain access to each other.

Meanwhile, it is determined whether to permit another network provided with a global IP address to access a certain private network by using the Graphic User Interface (GUI) (step S209). If yes, based on the node information in the mapping tables, a web page is generated, displaying a screen containing a private IP address, internal port values and global IP address, and external port values of the certain private network (step S210).

Accordingly, node information of the certain private network becomes available when the network having a global IP address accesses the web page of the certain private network by using the GUI.

As described, when using the protocol that enables information exchange between the internal network nodes of two separate networks which are spaced from each other, the node information of both networks can be available to each other by using the mapping tables.

Figure 5:
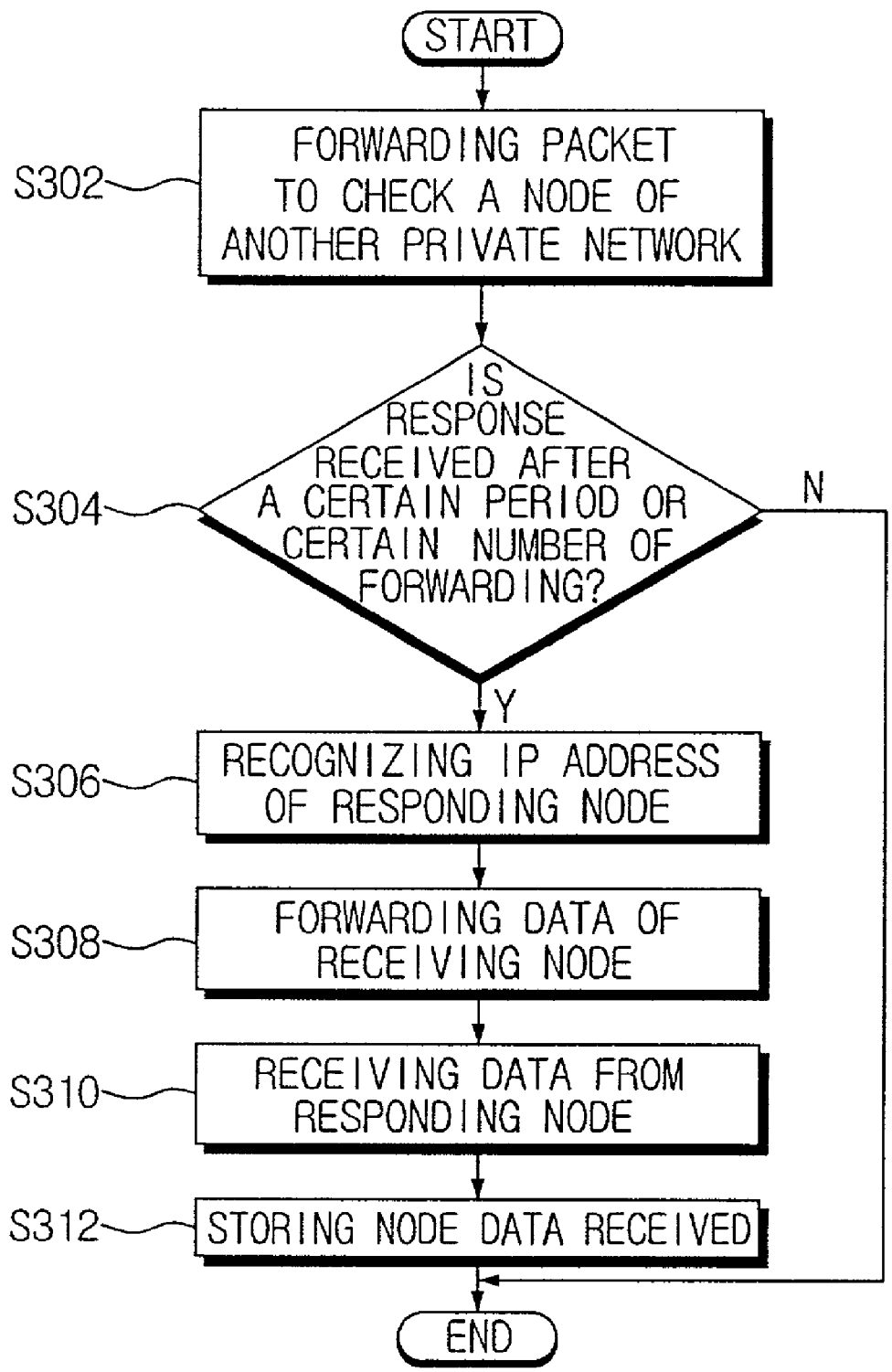
FIG. 5 is a flowchart for explaining the process of exchanging information among the nodes of the networks according to the present invention.
Figure 6:
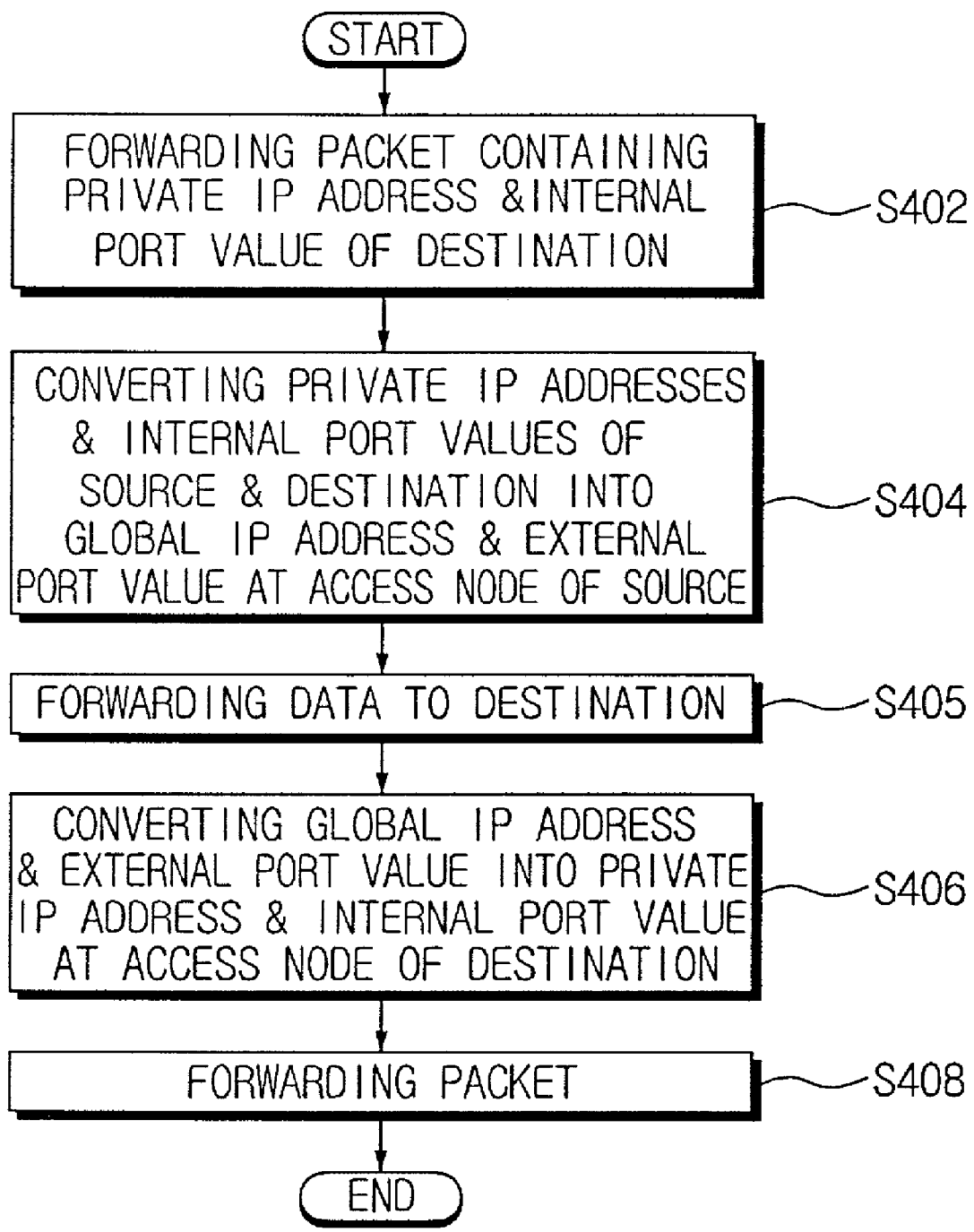
FIG. 6 is a flowchart for explaining the process of converting and transmitting a packet from one private network to another private network.

FIG. 5 is a flowchart for explaining the process of exchanging the network node information among the first and second networks 20 and 30 which are spaced from each other.

The first network node 20*b* of the first network 20 (hereinafter called 'node 1:1') forwards a packet to a certain network node of the second network 30 to check whether or not the certain node of the second network 30 uses the protocol according to the present invention as the node 1:1 has (step S302).

When there is a response from the certain node of the second network 30 at once or after several attempts (step S304), it is determined that the certain node of the second network 30 uses the same protocol as the node 1:1 of the first network 20. Accordingly, the node 1:1 recognizes the IP address of the certain node (step S306). If there is no response from the certain node of the second network 30, the process is finished.

As a result, the packet is forwarded from the source network node to the access node of the destination network (step S405).

When the packet is forwarded to the access node of the destination network, the global IP address and external port values of the source and destination networks are converted into the private IP address and internal port value (step S406).

Accordingly, the packet is forwarded to the network node which has internal port value (step S408).

Figure 7:
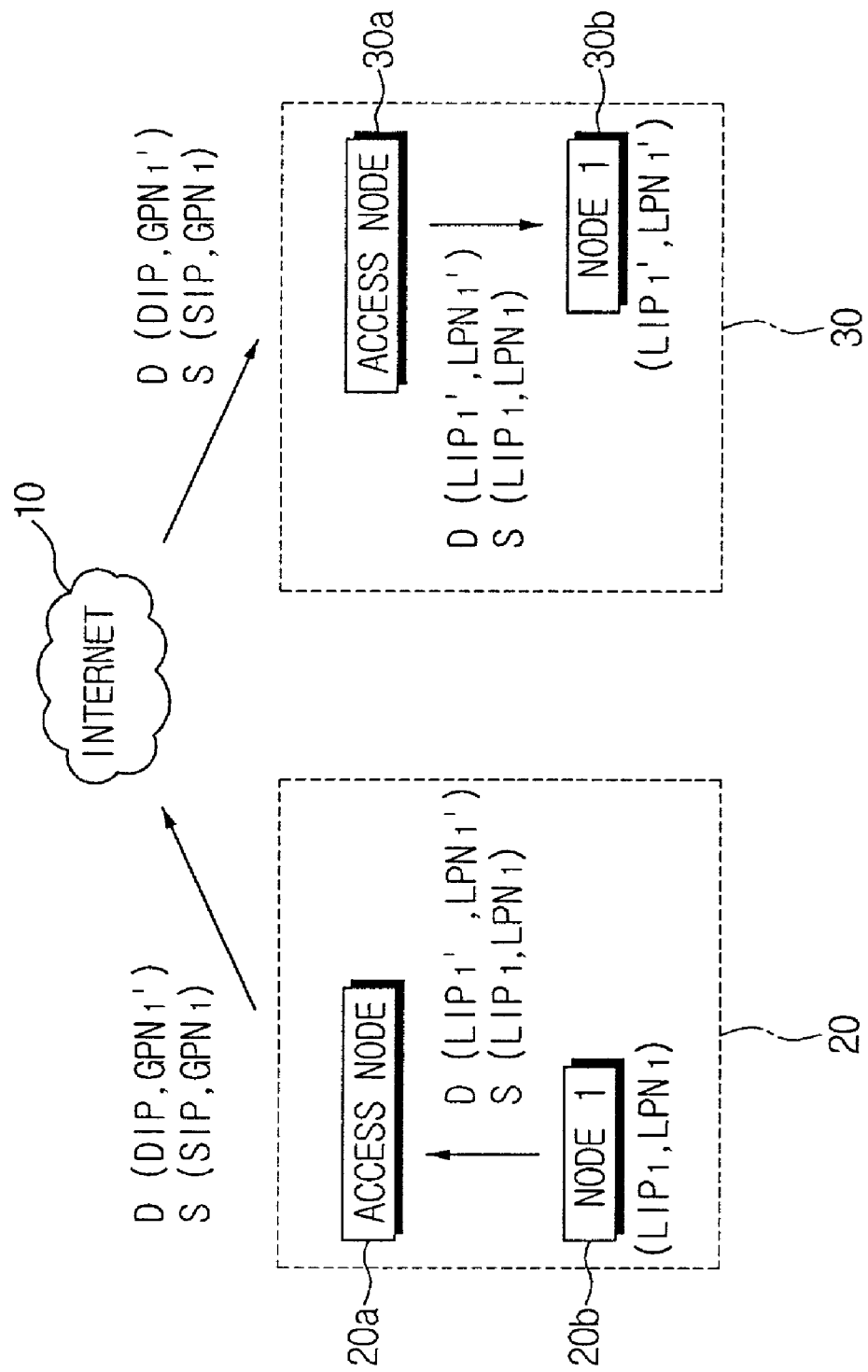
FIG. 7 is a view for showing one example of variation of IP addresses and port values during the packet transmission according to the present invention.

FIG. 7 is a view for showing the variation of the IP address and port values during the transmission of the packet according to the present invention.

The private IP address and port values of the node 1:1, i.e., the source network node are $LIP_1$ and $LPN_1$, while the private IP address and port values of the node 1:2, i.e., the destination network node are $LIP_1'$ and $LPN_1'$, respectively.

A packet having the private IP addresses and port values of the source and destination network nodes (S and D) is forwarded from the node 1:1:

S: $LIP_1$, $LPN_1$
D: $LIP_1'$, $LPN_1'$

According to the mapping table (see FIG. 4) stored in the access node 20*a* of the first network 20, the private IP address and port value are converted into global IP addresses and external port values.

S: SIP, $GPN_1$
D: DIP, $GPN_1'$

The packet having the global IP address and external port value of the source and destination network nodes (S and D) is forwarded to the access node 30*a* of the second network 30 via the Internet.

Then, according to the mapping table (see FIG. 4) stored in the access node 30*a* of the second network 30, the global IP address and external port values are converted into the private IP address and internal port values:

S: LIP1, $LPN_1$
D: LIP1', $LPN_1'$

Then the packet having the private IP address and port values of the source and destination network nodes (S and D) is forwarded to the node 1:2.

Meanwhile, in the step S302 of forwarding the packet from the node 1:1 to the certain node of the second network 30 to check whether the certain node of the second network 30 uses the same protocol as the node 1:1 according to this embodiment of the present invention (see FIG. 5), when there is no response from the certain node of the second network 30 within a predetermined period, it is determined that the certain node does not use the same protocol as the protocol of the node 1:1.

Accordingly, it is determined that information can not be exchanged between the node 1:1 and network nodes of the second network 30.

Meanwhile, if the first network 20 has a web page displaying the private IP addresses, internal port values, global IP address, and external port values of the respective network nodes 20*b*, 20*c*, and 20*d*, a node having the global IP address may access the second network 30 via the Internet.

Figure 8:
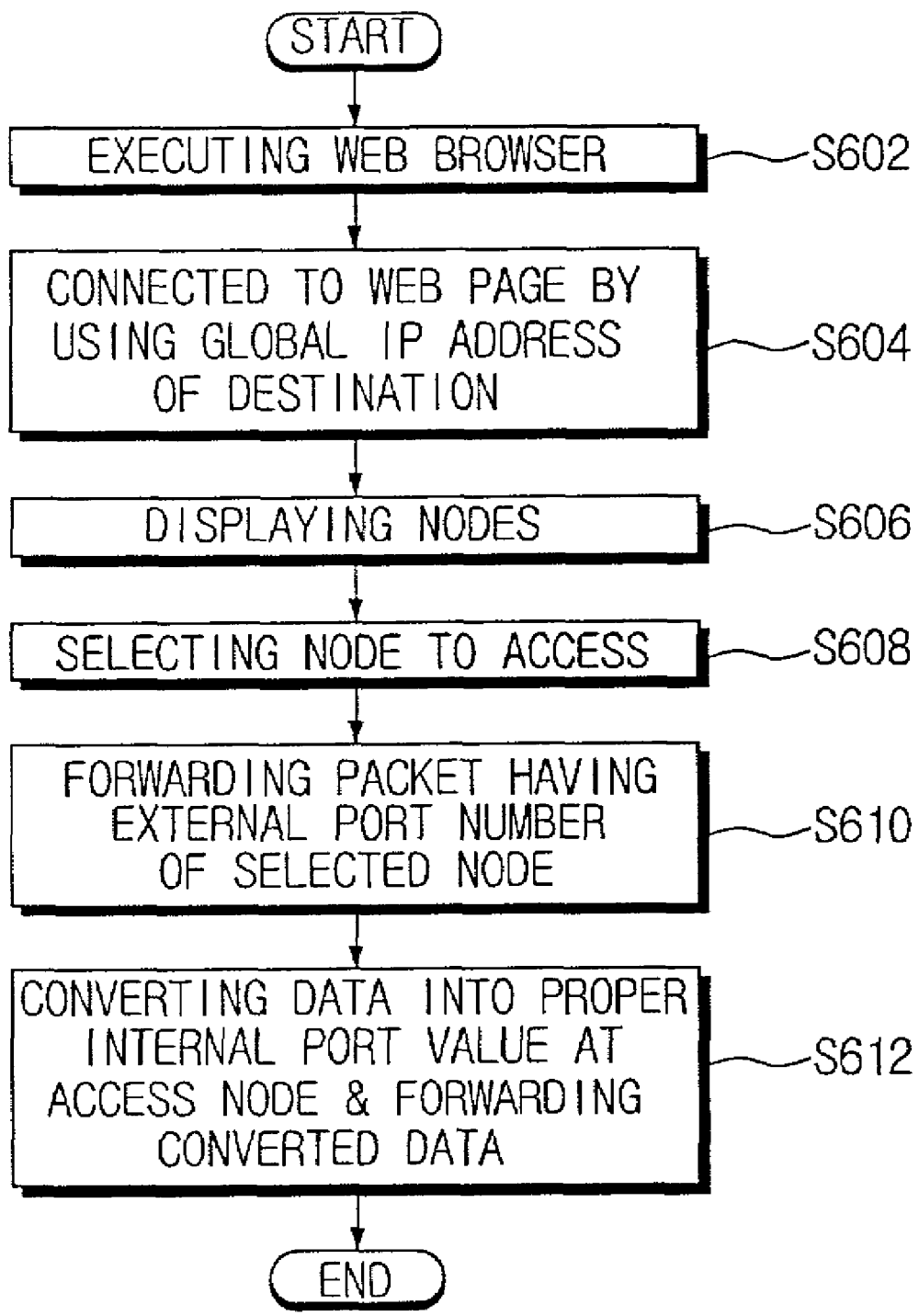
FIG. 8 is a flowchart for explaining the process of accessing the node of the network by using a Graphic User Interface (GUI) according to the present invention.

FIG. 8 is a flowchart for explaining the process of recognizing node information of a network by using a GUI.

In order to obtain the node information of the first network which has a global IP address, a web browser is used (step S602).

Then, a web page is accessed, by inputting the global IP address of the destination such as http://GIP/home.html (step S604).

When accessed, the web page is displayed, usually containing icons for the respective nodes 20*b*, 20*c*, 20*d*, and 20*e*.

Figure 9:
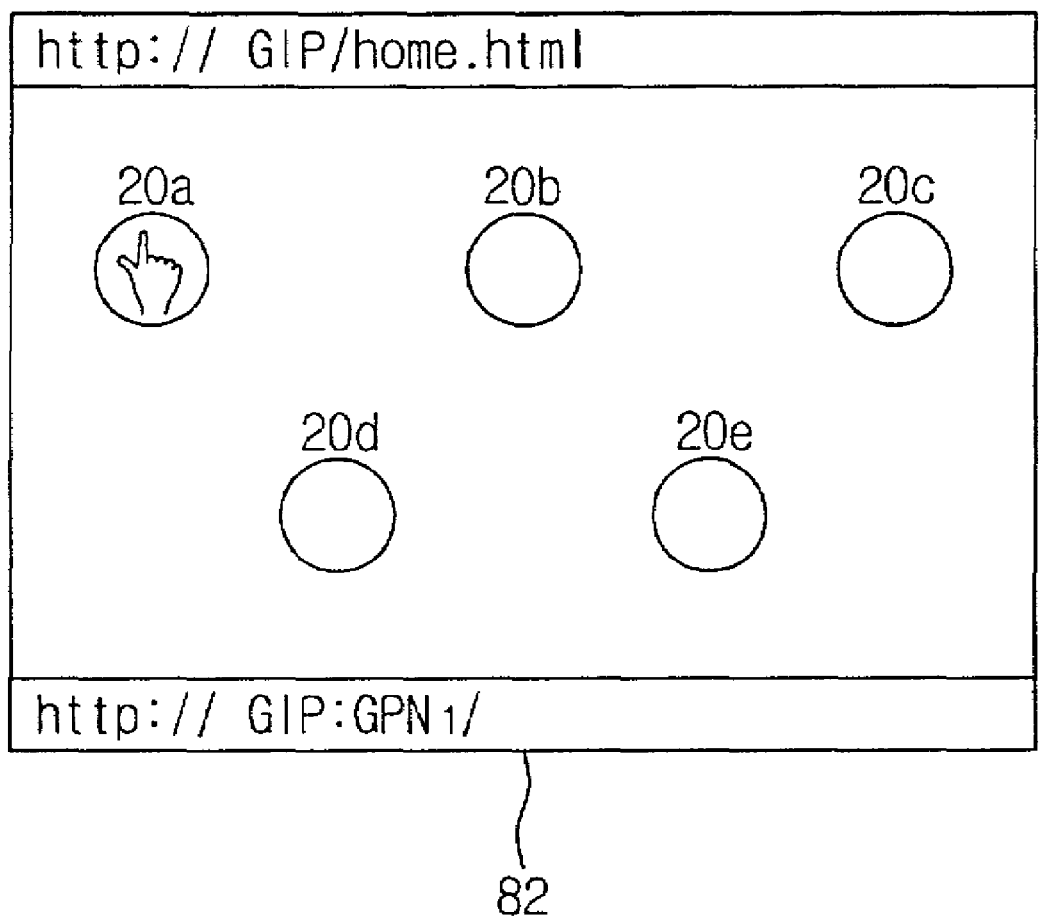
FIG. 9 is a view for showing an example of a screen displayed when accessing the IP address of the network.

FIG. 9 shows an exemplary screen, which is displayed when accessing the IP address of the first network 20.

As a user drags a cursor to an icon for the access node 20*a* of the first network 20, the global IP address and external port values of the access node 20*a* are displayed at the lower end of the screen as follows:

http://GIP:GPN1

Here, the 'http' uses a certain port number as its default value such as 0×80.

The port number may vary depending on the types of communication protocols being employed such as http, FTP, TELNET, etc.

When the user clicks an icon for the node she/he wishes to access (step S608), a packet having an external port number of the node 20*a* is forwarded (step S610).

The information of the packet is converted at the access node 20*a* into an internal port values for the network nodes 20*b*, 20*c*, 20*d*, and 20*e*, and forwarded to the network nodes 20*b*, 20*c*, 20*d*, and 20*e* (step S612).

As described, as for the network provided with a global IP address, the node information of the network can be obtained by accessing the global IP address and web page thereof via the GUI such as http, etc.

Although this embodiment has been described in the case where the IP is employed, it is also applicable to the case without the IP. For example, in an IEEE1394 network, the node information is collected during an initialization of the IEEE1394.

Accordingly, assigning the external port values from the access node to the network nodes is performed simultaneously with the initialization of the IEEE1394 network.

Further, based on the assigned external port values, the conversion is performed between the IP packet and IEEE1394.

More specifically, while the IP packet having a certain external port value is forwarded from the other network, the IEEE1394 packet having a certain node ID is transmitted within the network. The IP packet is converted into the IEEE1394 at the access node of the network.

As described above, with an access system and method for accessing a node of the private network according to the present invention, access to the private network, which is not provided with the global IP address, becomes possible.

Further, according to the present invention, by accessing a plurality of communication devices within a private network with a single IP address, excessive use of IP addresses can be avoided.

As stated above, the preferred embodiment of the present invention is shown and described. Although the preferred embodiment of the present invention has been described, it is understood that the present invention should not be limited to this preferred embodiment but various changes and modifications can be made by one skilled in the art within the spirit and scope of the present invention as hereinafter claimed.

What is claimed is:

1. A system, comprising:
    an assigning portion for assigning external port values to network nodes respectively corresponding to the external port values based on information collected from the network nodes of a private network, and storing the assigned external port values;
    an exchanging portion for exchanging the external port values of the respective network nodes of private networks; and
    an address converting portion for converting the external port values into corresponding private IP addresses and internal port values when a network node of one private network accesses another network node of another private network by using the external port values of another network node of another private network.

2. The system as claimed in claim 1, wherein each of the network nodes is assigned at least one external port value.

3. The system as claimed in claim 2, wherein the external port value has an http communication protocol.

4. The system as claimed in claim 2, wherein the external port value has an FTP communication protocol.

5. The system as claimed in claim 2, wherein the external port value has a TELNET communication protocol.

6. A method, comprising the steps of:
    a) assigning separate external port values to a plurality of network nodes of private networks based on information collected from the network nodes, and storing the assigned external port values;
    b) exchanging the assigned external port value of a certain network node of a certain private network with the assigned external port value of another network node of another private network, and storing the exchanged external port value; and
    c) converting the exchanged external port value into a corresponding private IP address and internal port value, enabling the certain network node of the certain private network to access another network node of another private network by using the external port value of another network node of another private network.

7. A method, comprising the steps of:
    a) assigning separate external port values to a plurality of network nodes of private networks based on information collected from the network nodes, and storing the assigned external port values;
    b) exchanging the assigned external port value of a certain network node of a certain private network with the assigned external port value of another network node of another private network, and storing the exchanged external port value; and
    c) converting the exchanged external port value into a corresponding private IP address and internal port value, enabling the certain network node of the certain private network to access another network node of another private network by using the external port value of another network node of another private network;
    wherein the step c) converts the private IP address and internal port value into a corresponding external port value for forwarding a packet from a certain private network to another external private network, while converting the external port value of another external private network into corresponding private IP address and internal port value for forwarding a packet from another external private network to the certain private network.

8. The method as claimed in claim 6, wherein each of the network nodes is assigned at least one external port value.

9. The method as claimed in claim 8, wherein the external port value has an http communication protocol.

10. The method as claimed in claim 8, wherein the external port value has an FTP communication protocol.

11. The method as claimed in claim 8, wherein the external port value has a TELNET communication protocol.

12. A method, comprising the steps of:
    i) assigning external port values to network nodes based on an information collected from the network nodes and storing the information in a mapping table;
    ii) generating a web page displaying node information of a private network, and linking the web page to a global IP address;
    iii) accessing the web page and the node information of the private network; and
    iv) accessing one of the network nodes of the private network based on the node information obtained in step iii).

13. The method as claimed in claim 12, wherein the node information of step iii) comprises an external port value.

14. The method as claimed in claim 12, wherein the web page of step ii) displays a screen containing icons for respective nodes of the private network.

15. The method as claimed in claim 14, wherein each node is accessed by selecting and clicking the icon representing the node.

16. The method as claimed in claim 12, wherein a private network provided with at least one global IP address performs step i).

17. The method as claimed in claim 12, wherein a certain network node of a certain external private network performs step iii).

18. The method as claimed in claim 17, wherein the certain network node of the certain external private network performs step iv).

19. A system for accessing a node of a private network, having a first network and a second network connected on the Internet, wherein
    the first network comprises:
    a first external port value assigning portion for assigning first external port values to first network nodes based on information collected from the first network nodes;
    a first exchanging portion for exchanging an external port value of a certain node of the first network with an external port value of one of the nodes of the second network, and storing the exchanged external port value; and
    a first address converting portion for converting the external port value of the certain node of the first network into a corresponding external port value, enabling the certain node of the first network to access the one of the network nodes of the second network, and
    the second network comprises:
    a second external port value assigning portion for assigning second external port values to second network nodes based on information collected from the second network nodes;
    a second exchanging portion for exchanging an external port value of a certain node of the second network with an external port value of one of the nodes of the first network, and storing the exchanged external port value; and a second address converting portion for converting the external port values of the certain node of the second network into a corresponding private IP address, enabling the one of the nodes of the first network to access the certain node of the second network by using the external port value of the one of the nodes of the second network.

* * * * *